United States Patent
Marais

(10) Patent No.: US 12,325,421 B2
(45) Date of Patent: Jun. 10, 2025

(54) METHOD FOR HOLDING A TWO-TRACK MOTOR VEHICLE

(71) Applicant: Bayerische Motoren Werke Aktiengesellschaft, Munich (DE)

(72) Inventor: Yoann Marais, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 239 days.

(21) Appl. No.: 18/023,207

(22) PCT Filed: Aug. 2, 2021

(86) PCT No.: PCT/EP2021/071539
§ 371 (c)(1),
(2) Date: Feb. 24, 2023

(87) PCT Pub. No.: WO2022/043005
PCT Pub. Date: Mar. 3, 2022

(65) Prior Publication Data
US 2023/0311880 A1    Oct. 5, 2023

(30) Foreign Application Priority Data
Aug. 26, 2020  (DE) .................... 10 2020 122 275.0

(51) Int. Cl.
*B60W 30/18*     (2012.01)
*B60K 1/02*      (2006.01)
(Continued)

(52) U.S. Cl.
CPC .... *B60W 30/18118* (2013.01); *B60L 15/2018* (2013.01); *B60W 10/08* (2013.01);
(Continued)

(58) Field of Classification Search
CPC ..... B60W 30/18136; B60W 30/18118; B60W 30/18054; B60W 30/181; B60W 10/08;
(Continued)

(56) References Cited

U.S. PATENT DOCUMENTS

2010/0121515 A1*  5/2010  Izumi .................. B60W 10/184
                                                     701/22
2013/0054062 A1   2/2013  Matsushita
(Continued)

FOREIGN PATENT DOCUMENTS

DE     10 2012 015 617 A1    2/2014
DE     10 2012 223 867 A1    6/2014
(Continued)

OTHER PUBLICATIONS

International Search Report (PCT/ISA/210) issued in PCT Application No. PCT/EP2021/071539 dated Oct. 21, 2021 with English translation (five (5) pages).
(Continued)

*Primary Examiner* — Christian Chace
*Assistant Examiner* — Upul P Chandrasiri
(74) *Attorney, Agent, or Firm* — Crowell & Moring LLP

(57) ABSTRACT

A method for holding a two-track motor vehicle. The motor vehicle has at least one electric drive machine. Four wheels of the motor vehicle can be held via a service brake. In an initial situation when the motor vehicle is at a standstill, the motor vehicle is held by virtue of a motor torque of the electric drive machine applied to at least two wheels. In a manner dependent on a situation and/or gradient, the motor torque that holds the at least two wheels is reduced at one wheel. After the motor torque at the one wheel is reduced, the service brake at the wheel is activated. After the service brake at the one wheel is activated, the motor torque at a further wheel is reduced. After the motor torque at the further wheel is reduced, the service brake at the further wheel is activated.

12 Claims, 2 Drawing Sheets

(51) Int. Cl.
 *B60L 15/20* (2006.01)
 *B60W 10/08* (2006.01)
 *B60W 10/184* (2012.01)

(52) U.S. Cl.
 CPC .......... *B60W 10/184* (2013.01); *B60K 1/02* (2013.01); *B60L 2240/423* (2013.01); *B60W 2552/15* (2020.02); *B60W 2710/083* (2013.01); *B60W 2710/18* (2013.01)

(58) Field of Classification Search
 CPC .......... B60W 10/184; B60W 2552/15; B60W 2710/083; B60W 2710/18; B60L 15/2018; B60L 2240/423; B60K 1/02; B60T 7/12; B60T 2201/06
 See application file for complete search history.

(56) References Cited

U.S. PATENT DOCUMENTS

| | | | | |
|---|---|---|---|---|
| 2017/0232969 | A1* | 8/2017 | Hunt | B60T 8/17 477/93 |
| 2017/0361827 | A1 | 12/2017 | Crombez | |
| 2018/0244158 | A1* | 8/2018 | Komatsu | B60W 10/18 |
| 2018/0290655 | A1 | 10/2018 | Sato | |
| 2023/0014298 | A1* | 1/2023 | Agnew | E02F 9/02 |
| 2023/0042527 | A1* | 2/2023 | Jaccoud | B60W 30/18063 |
| 2023/0109143 | A1* | 4/2023 | Vollmar | E02F 9/0891 414/697 |
| 2023/0311880 | A1* | 10/2023 | Marais | B60L 15/2018 701/22 |

FOREIGN PATENT DOCUMENTS

| | | |
|---|---|---|
| DE | 10 2012 223 866 A1 | 7/2014 |
| DE | 10 2014 003 992 A1 | 9/2015 |
| DE | 10 2017 113 016 A1 | 12/2017 |
| GB | 2 452 136 A | 2/2009 |

OTHER PUBLICATIONS

German-language Written Opinion (PCT/ISA/237) issued in PCT Application No. PCT/EP2021/071539 dated Oct. 21, 2021 (six (6) pages).

German-language Search Report issued in German Application No. 10 2020 122 275.0 dated Jan. 20, 2021 with partial English translation (10 pages).

* cited by examiner

METHOD FOR HOLDING A TWO-TRACK MOTOR VEHICLE

BACKGROUND AND SUMMARY

The invention relates to a method for holding a two-track motor vehicle, and in particular for holding a two-track motor vehicle on an inclined surface.

With regard to the prior art, reference is made by way of example to DE 10 2017 113 016 A1, DE 10 2012 223 867 A1, and DE 10 2012 223 866 A1.

Known holding functions (such as a so-called auto-hold function, hill assist, or the so-called B hold function) of motor vehicles, especially those driven by internal combustion engines, hold the vehicle, especially on an inclined surface, by means of the service brake.

In a motor vehicle with an electric drive system, the electric drive motor can impress a motor torque into the drive train. To prevent the vehicle from rolling back after being braked by the electric drive motor, particularly when stopping on an inclined surface, the service brake must conventionally be actuated depending on the inclination. Such a braking and holding concept is known, for example, from DE 10 2017 113 016 A1.

In current concepts for electric vehicles, a strongly pronounced overrun deceleration is provided when the accelerator pedal is released until the vehicle comes to a standstill, wherein a correspondingly high recovery torque of the electric drive motor is set so that the driver can both accelerate by actuating the accelerator pedal and specify a desired deceleration when the accelerator pedal is released. This leads to a so-called "one-pedal feeling," i.e., a feeling of being able to control the vehicle using only an accelerator pedal. This "one-pedal feeling" significantly reduces the use the brake pedal.

In this concept, unlike typical automatic vehicles, the electric vehicle also does not exhibit creep, i.e., the motor vehicle does not move in the forward direction on a flat surface with no incline when a driving gear (typically referred to as a D driving gear; D-drive) is engaged that is associated with the forward direction of the vehicle; the same is true for the reverse direction. The creep of a motor vehicle is poorly compatible with a "one-pedal feeling," since this requires, for example, frequent actuation of the brake pedal to stop the creep of the vehicle.

It is also known from DE 10 2012 223 867 A1 and DE 10 2012 223 866 A1 that vehicles with electric drive systems use a motor torque by the electric drive system to continue holding the vehicle, which is already at a standstill, in particular on an inclined surface. Depending on the gradient of the roadway and the length of time the vehicle is held at a standstill, the capability of the electric drive motor reduces sooner or later. The motor holding torque of the electric drive motor is then reduced (for example after a certain time) and an alternative holding system, in particular the service brake, takes over and holds the vehicle at a standstill.

However, a disadvantage of the stated prior art is that, during the transition from motor-based holding by the electric drive motor to holding by the service brake, in particular due to the reduction of the motor torque of the electric drive motor while the service brake takes over or while the service brake is activated, undesirable and uncomfortable noises and vibrations occur for a vehicle occupant. This is because in order to continue to hold the vehicle safely at a standstill, the transition from holding on the drive side to holding by the service brake must occur simultaneously. In particular, a vehicle occupant experiences such vibrations through a creaking noise.

Thus, it is the object of the invention to improve a method for holding a two-track motor vehicle at a standstill with respect to the comfort for a vehicle occupant.

The object is achieved by a method for holding a two-track motor vehicle having the features of the independent claim. Advantageous embodiments and developments are the content of the dependent claims.

For the purposes of the application, the term "motor vehicle with an electric drive motor" preferably includes both an electric vehicle that can be charged via an external electrical power supply and has an optional internal combustion engine range extender and a hybrid vehicle with an internal combustion engine and one (or more) electric drive motors.

In a first exemplary embodiment, the motor vehicle comprises two electric drive motors: one for driving the wheels on the front axle and one for driving the wheels on the rear axle.

In another exemplary embodiment, the motor vehicle comprises four wheel-specific electric drive motors, which are known in particular as so-called wheel hub motors. In such a case with wheel-specific wheel electric drive motors, each wheel can be driven individually by an electric drive motor assigned to it.

As already mentioned at the outset, the two-track motor vehicle comprises at least one (preferably at least two) electric drive motor(s). If the motor vehicle comprises, for example, only a single electric drive motor, it is preferably provided that this drives only the wheels of one axle, i.e. either those wheels of the front axle or those of the rear axle.

Furthermore, the two-track motor vehicle comprises at least four wheels, wherein each of these wheels can be held in position or secured against rotation by a service brake. The service brake can, for example, be an electrically, electro-hydraulically, electro-mechanically or hydraulically actuatable braking device. Particularly preferred is the above-mentioned concept of an electric vehicle with a "one-pedal feeling."

In an initial position of the motor vehicle ("vehicle" for short), the vehicle is at a standstill, wherein the vehicle is held by the application of a motor torque of the at least one electric drive motor.

In the case of only a single electric drive motor, it is preferred that the wheels of one axle be held by a motor torque from the single electric drive motor, while the wheels of the other axle can be held by a conventional service brake.

It is also possible for the vehicle to be held at a standstill by the application of a service brake and simultaneously by the application of a motor torque by the electric drive motor.

In the case of the initially mentioned design with two electric drive motors (for example one for driving the wheels of the front axle and one for driving the wheels of the rear axle), it is preferably provided that all wheels of the vehicle are held in the initial position, or are prevented from turning or rolling, via a motor torque of the electric drive motors (and, if necessary, additionally via respective service brakes).

Likewise, in the case of the aforementioned design with (four) wheel-specific electric drive motors, it is preferably provided that in the initial position all four wheels are held, or are secured against rolling or turning, by a motor torque of their respective electric drive motors.

Particularly preferably, the motor vehicle is in the initial position on an inclined surface or on a roadway that has a gradient, i.e., for example on a hill.

In a next step, it is provided that the motor torque for holding the vehicle in the initial position is reduced at a single wheel or at a maximum of two wheels of the motor vehicle, in particular depending on the situation and/or the gradient and/or time.

In the case of a single electric drive motor generating the torque to hold two wheels of the vehicle, it is preferably provided that the torque be reduced at both wheels. At the same time, however, it is provided that the other two wheels are held by a service brake.

In particular, in the case of two or more electric drive motors, it is preferably provided that the motor torque of the electric drive motor(s) is initially reduced at only one wheel, while no such reduction takes place at the other wheels, which are held by the motor torque of the electric drive motor(s).

This ensures that during the reduction of the motor torque at only one wheel (or at most at two wheels), the vehicle continues to be held by, preferably, an applied motor torque at the other wheels, and an unintentional movement of the vehicle is prevented.

The reduction of the torque of the electric drive motor at the one wheel (or at the maximum of two wheels) is preferably complete here, i.e. until there is no more motor torque applied to this wheel, i.e. in essence the reduction is to 0 Nm.

During the period in which the motor torque of the electric drive motor(s) reduces at the respective wheel(s), it is preferably provided that no service braking torque of the service brake of the respective wheel is applied to this wheel(s). In other words, it is provided that the service brake at the respective wheel is not activated or open during the reduction of the motor torque of the electric drive motor(s).

After (preferably complete) reduction of the motor torque at the one wheel or the maximum two wheels of the motor vehicle, it is provided that the service brake takes over the holding of this particular wheel.

If, for example, the motor torque is completely dissipated at this single wheel, the service brake at this wheel is still open, i.e. not yet active, until the motor torque is completely reduced. The vehicle is then prevented from rolling away by preventing the other wheels from turning, in particular by applying a motor torque of the electric drive motor(s). In this example, once the motor torque has been completely reduced, the service brake at this wheel is activated so that this held wheel again contributes to the holding of the vehicle.

The fact that the service brake is not activated during the (preferably complete) reduction of the motor torque, but only becomes active after the torque has been reduced, means that there is no disadvantageous creaking noise. The time gap in which the particular wheel at which the reduction takes place is no longer prevented from rolling until the service brake is actually active is compensated for by holding the other wheels so that the vehicle is prevented from rolling away.

As already mentioned, it is preferably provided that the motor torque of the electric drive motor(s) at the particular wheel is reduced depending on the situation and/or time and/or gradient. For example, such a reduction can take place depending on a foreseeable holding duration of the vehicle at a standstill, for example by a known traffic light switching duration or a foreseeable traffic jam delay duration or the like. It is alternatively or additionally possible that the reduction of the motor torque at the particular wheel is also dependent on the particular gradient of the roadway on which the holding vehicle is located. If, for example, the vehicle is on a flat roadway, which can be determined by different sensors or data, the reduction of the motorized torque might take place only very late or not at all, since, from an energy point of view, the electric drive motor itself is capable of holding the vehicle in the initial position and for a long period of time in this position by applying a motorized torque to the respective wheels. If, on the other hand, a holding of the vehicle is detected on a roadway having a steeper gradient, in which case the electric drive motor, for energy reasons, can only ensure that the vehicle is held for a certain period of time by means of a stated motor torque, it could be provided that a stated reduction of the motor torque at the particular wheel takes place already after a shorter period of time.

Alternatively or additionally, it is also possible for the reduction of the motor torque to be time-dependent. If, for example, a predefined dwell time of the vehicle in the initial position (holding position of the vehicle via a motor torque of the electric drive motor) is registered, the reduction of the motor torque can take place at the respective wheel.

Alternatively or additionally, it is possible that the reduction occurs depending on a sensed capability of the electric drive motor.

After a change or a transition from a drive-based holding by the motor torque of the drive motor to a brake-based hold by the service brake has now taken place at a first wheel (or at a maximum of two wheels) of the vehicle, it is provided that these method steps are now carried out repeatedly at the other wheels, which are held by a motor torque of the electric drive motor(s).

It is therefore provided that (again preferably depending on the situation and/or time and/or gradient) after activation of the service brake at the one wheel (or at the maximum of two wheels), the motor torque of the electric drive motor(s) is reduced at a further wheel of the vehicle. This reduction is also preferably complete again, i.e. until the torque applied has reached substantially 0 Nm. After the reduction of the torque at this further wheel, the service brake is activated at this further wheel.

These two method steps ("reduction of the motor torque" and subsequent "activation of the service brake" at the particular wheel), preferably depending on the situation or time or gradient, are thus performed successively or sequentially at each wheel which is held in the initial position of the vehicle by a motor torque of the electric drive motor.

During the course of these two method steps at a particular wheel, the respective other wheels take over the holding of the vehicle, either via an already activated service brake or via a still existing motor torque of the electric drive motor(s).

During a reduction of the motor torque of the drive motor(s) at a wheel, the service brake is therefore preferably not active at any wheel of the vehicle. As a result, the above-mentioned creaking noise can be advantageously avoided during the transition from holding by the electric drive motor to holding by the service brake. This ensures comfortable and noise-reduced holding behavior of the vehicle.

In a preferred embodiment of the invention, the claimed method is carried out depending on the situation or gradient. Thus, if a certain gradient of the roadway is reached while the vehicle is in the initial position (holding position), it is provided that the method is carried out. Alternatively or additionally, the method can be carried out if, in addition to the gradient, it is detected that the capability of the electric drive motor is no longer sufficient to hold the vehicle in the holding position on its own for a certain duration, or if it is detected that it is no longer sensible from an energy perspective to hold the vehicle via the motor torque of the electric drive motor due to a foreseeable or achieved holding duration.

In addition to the stated method, a motor vehicle is also proposed which allows the aforementioned method to be carried out. As already mentioned, the motor vehicle comprises here at least one electric drive motor and at least four wheels. Here, each of the four wheels can be held by a service brake for holding the wheels or by ensuring a rotation lock.

These and further features are apparent not only from the claims and the description but also from the drawings, wherein it is possible for the individual features to be realized in each case on their own or jointly in the form of sub-combinations in an embodiment of the invention and to constitute advantageous embodiments which are protectable in their own right and for which protection is claimed here.

In the following, the invention is further explained by means of an exemplary embodiment. All the features described in greater detail may be essential to the invention.

DETAILED DESCRIPTION OF THE DRAWINGS

Figure 1:
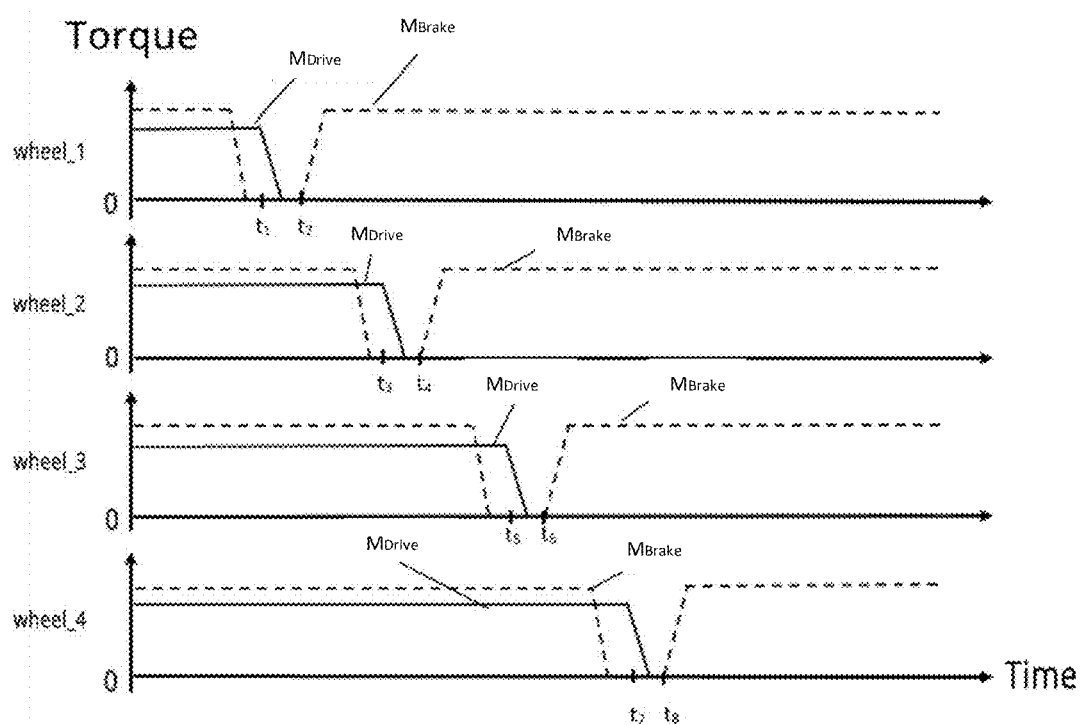
FIG. 1 is a diagram of torque curves of a motor vehicle having four wheels so as to illustrate the method according to an embodiment of the invention.
Figure 2:
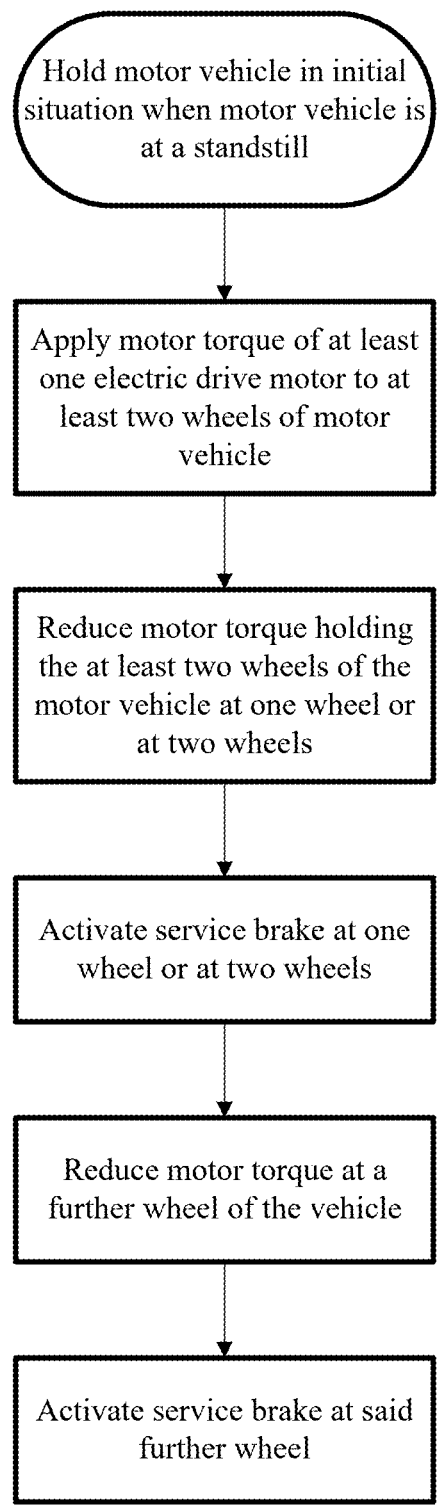
FIG. 2 is a flow chart for a method of holding a two-track motor vehicle according to an embodiment of the invention.

FIG. 1 shows a schematic exemplary embodiment of a torque curve (holding or braking torque curve) diagram of a motor vehicle having four wheels (wheel_1; wheel_2; wheel_3, wheel_4) over time. Here, each wheel (wheel_1; wheel_2; wheel_3, wheel_4) comprises a service brake, which can apply a braking torque or service braking torque $M_{Brake}$ (dashed line) to the respective wheel. Furthermore, a motor torque $M_{Drive}$ (solid line) of the electric drive motor can be applied to each wheel individually. In particular, an electric drive motor, for example in the form of a wheel hub motor, is provided here for each individual wheel. FIG. 2 is a flow chart illustrating the method described herein.

In an initial position, the vehicle is in a holding position, in particular on a hill. The vehicle is held until time $t_1$ by the application of a motor torque $M_{Drive}$ of the electric drive motor, which is applied to all four wheels wheel_1, wheel_2; wheel_3, wheel_4 of the vehicle. Additionally, but not limitingly, the vehicle is held in this specific case by the application of the service brake to all four wheels wheel_1, wheel_2; wheel_3, wheel_4. However, it is also contemplated that the vehicle is held stationary solely by the application of a motor torque $M_{Drive}$ to each wheel. In a vehicle concept with the "one-pedal feeling" described at the outset, the vehicle is held at a standstill by a motor torque $M_{Drive}$ of the respective wheel-specific electric drive motors applied to each wheel.

For example, the vehicle may be at a red light and on a road with a gradient.

The braking process until the vehicle comes to a standstill is preferably also implemented here by the respective electric drive motor (cf. "one-pedal feeling" concept above). As already mentioned, it is also possible for the service brake to be activated at the same time as the vehicle is held by the electric drive motor by applying a service braking torque $M_{Brake}$ to the wheels.

If (at time $t_1$), for example via sensors, navigation data, online data, vehicle data or the like, a low capability or an energetically unreasonable setting of the electric drive motors is detected due to an excessive gradient of the roadway or due to an excessively long dwell time of the vehicle in the holding position that is foreseeable that has or already occurred, it is provided that the service brake ensures and takes over the holding position of the vehicle by applying a corresponding braking torque $M_{Brake}$ to the relevant wheel.

In contrast to the prior art, the service brake is then not activated simultaneously and in overlapping fashion with a motor torque $M_{Drive}$ still applied at each wheel, but is built up sequentially at each wheel in turn, while the motor torque at the respective wheel has already been completely reduced.

If the service brake is already activated beforehand when the vehicle is held at a standstill, it is fully released before time $t_1$ at the first wheel, wheel_1, so that there is no service braking torque $M_{Brake}$ at the time $t_1$ at the first wheel, wheel_1.

At the time $t_1$, the motor torque $M_{Drive}$ of the first wheel, wheel_1, of the vehicle is then reduced to 0 Nm. Only at the time $t_2$, when the motor torque $M_{Drive}$ of the electric drive motor of the first wheel has been completely reduced, is the service brake at this first wheel activated by a building braking torque $M_{Brake}$ of the service brake. The brake deficit, which occurs between the time of the start of the reduction of the motor torque $M_{Drive}$ at the first wheel and the complete build-up of the service braking torque $M_{Brake}$ at the first wheel, can be compensated or bridged by the braking torque $M_{Brake}$ or $M_{Drive}$ still present at the other three wheels: wheel_2, wheel_3, wheel_4. Thus, the holding torque $M_{Brake}$ or $M_{Drive}$ at the other three wheels, wheel_2, wheel_3, wheel_4, is high enough to keep the vehicle in the holding position. By completely reducing the motor torque $M_{Drive}$ at the first wheel, wheel_1, during which the service brake of the first wheel, wheel_1 is open or inactive, uncomfortable noise development can be advantageously avoided.

In a next step, at the time $t_3$, when the service braking torque $M_{Brake}$ of the first wheel, wheel_1 has already been fully built up and has completely taken over the holding of the first wheel, the motor torque $M_{Drive}$ of the electric drive motor of the second wheel, wheel_2, is reduced to 0 Nm at the second wheel, wheel_2. Here, it must again be ensured that the service brake at the second wheel is no longer activated (i.e., open) at the time $t_3$ of the reduction of the motor torque $M_{Drive}$ at the second wheel, wheel_2. After complete reduction of the motor torque $M_{Drive}$ of the electric drive motor of the second wheel, wheel_2, at the time $t_4$, the service brake at the second wheel, wheel_2, is activated by building up a service braking torque $M_{Brake}$ of the service brake. The service brake of the second wheel, wheel_2, then takes over the holding of the second wheel.

Subsequently, as can be seen in FIG. 1, the same method steps are carried out with the other two wheels, wheel_3 and wheel_4. After the service braking torque $M_{Brake}$ has been fully built up at the second wheel, wheel_2, and while ensuring that the service brake at the third wheel, wheel_3, is deactivated, at the time $t_5$, the motor braking torque $M_{Drive}$ of the third wheel, wheel_3, is reduced to 0 Nm. Then, after the motor torque $M_{Drive}$ at the third wheel, wheel_3, has been completely reduced, at the time to, the service brake of the third wheel, wheel_3, is activated.

After complete activation of the service brake at the third wheel, wheel_3, and while ensuring that the service brake at the fourth wheel, wheel_4, is not activated (i.e., open), the applied motor torque $M_{Drive}$ at the fourth wheel, wheel_4, is reduced to 0 Nm (time $t_7$). Only once this torque $M_{Drive}$ of the fourth wheel, wheel_4, has been completely reduced (start of reduction at the time $t_7$) is the service brake of the fourth wheel, wheel_4, activated (time $t_5$).

While the motor torque $M_{Drive}$ is being reduced and a service braking torque $M_{Brake}$ is subsequently being built up at the respective wheel, the holding torques $M_{Brake}$ or $M_{Drive}$ acting at the other wheels prevent the vehicle from rolling away when at a standstill.

The fact that the service brake at the respective wheels is not activated, i.e., is open, during the reduction of the motor torque $M_{Drive}$ at the respective wheels, means that the described creaking noise is absent.

The invention claimed is:

1. A method for holding a two-track motor vehicle, wherein the motor vehicle comprises at least one electric drive motor, and wherein each of four wheels of the motor vehicle is holdable by a service brake, the method comprising:
   holding the motor vehicle in an initial situation when the motor vehicle is at a standstill by applying a motor torque of the at least one electric drive motor to at least two wheels of the motor vehicle;
   reducing the motor torque holding the at least two wheels of the motor vehicle at one wheel or at two wheels;
   after reducing the motor torque at the one wheel or at the two wheels, activating the service brake at said one wheel or at said two wheels;
   after activating the service brake at said one wheel or at said two wheels, reducing the motor torque at a further wheel of the vehicle; and,
   subsequent to reducing the motor torque at the further wheel of the vehicle, activating the service brake at said further wheel.

2. The method according to claim 1, wherein the motor vehicle comprises two electric drive motors, and wherein:
   in the initial situation, two of the four wheels of the motor vehicle are held by a respective motor torque of a respective electric drive motor of the motor vehicle.

3. The method according to claim 1, wherein the motor vehicle comprises four electric drive motors, and wherein:
   in the initial situation, each of the four wheels of the motor vehicle is held by a motor torque of one of the four electric drive motors, respectively.

4. The method according to claim 1, wherein the method is carried out successively on all wheels of the motor vehicle held by an electric motor depending on a situation and/or a gradient and/or a time.

5. The method according to claim 2, wherein the method is carried out successively on all wheels of the motor vehicle held by an electric motor depending on a situation and/or a gradient and/or a time.

6. The method according to claim 3, wherein the method is carried out successively on all wheels of the motor vehicle held by an electric motor depending on a situation and/or a gradient and/or a time.

7. The method according to claim 4, wherein
   the motor torque at a respective wheel is reduced depending on the situation and/or the gradient and/or time.

8. The method according to claim 7, wherein
   the reducing of the motor torque at a respective wheel is reduced from a foreseeable and/or achieved dwell time of the motor vehicle in the held position and/or as soon as a limit capability of the electric drive motor is detected.

9. The method according to claim 1, wherein
   the reducing of the motor torque at a respective wheel is reduced as soon as a limit gradient of a vehicle roadway is detected.

10. The method according to claim 1, wherein
    the method is carried out as soon as a limit gradient of a vehicle roadway is reached.

11. The method according to claim 1, wherein
    during the reducing of the motor torque at a particular wheel, the service brake at said particular wheel is deactivated.

12. A motor vehicle, comprising:
    a two-track vehicle having four wheels;
    at least one electric drive motor for the two-track vehicle, wherein each of four wheels of the motor vehicle comprises a service brake for holding the respective wheel; and
    wherein the motor vehicle is configured to:
       hold the motor vehicle in an initial situation when the motor vehicle is at a standstill by applying a motor torque of the electric drive motor to at least two wheels of the motor vehicle;
       reduce the motor torque holding the at least two wheels of the motor vehicle at one wheel or at two wheels;
       after reducing the motor torque at the one wheel or at the two wheels, activate the service brake at said one wheel or at said two wheels;
       after activating the service brake at the one wheel or at the two wheels, reduce the motor torque at a further wheel of the vehicle; and,
       subsequent to reducing the motor torque at the further wheel of the vehicle, activate the service brake at said further wheel.

* * * * *